US 8,417,767 B2

Apr. 9, 2013

(12) United States Patent
Yang

(10) Patent No.: US 8,417,767 B2
(45) Date of Patent: Apr. 9, 2013

(54) CALL CONTROL METHOD, DEVICE, AND SYSTEM

(75) Inventor: Yijin Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 12/823,265

(22) Filed: Jun. 25, 2010

(65) Prior Publication Data

US 2010/0262654 A1 Oct. 14, 2010

Related U.S. Application Data

(63) Continuation of application No. PCT/CN2009/073552, filed on Aug. 27, 2009.

(30) Foreign Application Priority Data

Dec. 29, 2008 (CN) .......................... 2008 1 0189486

(51) Int. Cl.
G06F 15/16 (2006.01)

(52) U.S. Cl. ........ 709/203; 709/245; 709/227; 370/389; 370/401; 370/254; 370/384; 370/382

(58) Field of Classification Search .................. 709/203, 709/244, 224–227, 245
See application file for complete search history.

(56) References Cited

U.S. PATENT DOCUMENTS

| 7,292,566 | B2* | 11/2007 | Takahashi | 370/352 |
|---|---|---|---|---|
| 7,428,219 | B2* | 9/2008 | Khosravi | 370/254 |
| 7,801,059 | B2* | 9/2010 | Miyajima et al. | 370/254 |
| 2006/0268692 | A1* | 11/2006 | Wright et al. | 370/229 |
| 2007/0165800 | A1 | 7/2007 | Imura et al. | |
| 2008/0078189 | A1 | 4/2008 | Ando | |
| 2011/0312390 | A1* | 12/2011 | Wang et al. | 455/567 |

FOREIGN PATENT DOCUMENTS

| CN | 1741453 A | 3/2006 |
|---|---|---|
| CN | 1859517 A | 11/2006 |
| CN | 101060560 A | 10/2007 |
| WO | WO 01/61940 A1 | 8/2001 |
| WO | WO 02/093888 A1 | 11/2002 |
| WO | WO 2006/114412 A1 | 11/2006 |

OTHER PUBLICATIONS

Low, Colin; "The Internet Telephony Red Herring"; XP 002043669; Hewlett-Packard; dated May 15, 1996.
Chen, Qi; "Introduction of Unified Communication"; ZTE Communications; dated Jun. 27, 2008.

(Continued)

Primary Examiner — Jude Jean Gilles
(74) Attorney, Agent, or Firm — Brinks Hofer Gilson & Lione

(57) ABSTRACT

A method, a device, and a system for realizing unified communication in the field of communication are provided, so as to solve the problems in the conventional art that a client can only initiate a call to a terminal instead of controlling the subsequent call and that no call association exists between the client and the terminal. A call control method of a softswitch equipment includes: sending a call identification and call state information to an application server, so that the application server sends the call identification and the call state information of the call to a client bound to a terminal; receiving a control request including the call identification and a control instruction and sent by the application server; and controlling the call corresponding to the call identification according to the control instruction in the control request. The present invention is applicable to the unified communication mode.

8 Claims, 14 Drawing Sheets

OTHER PUBLICATIONS

International Search Report related to International Application No. PCT/CN2009/073552; mailing date of Dec. 3, 2009; Huawei Tech Co., Ltd. et al.

Written Opinion of the International Searching Authority related to International Application No. PCT/CN2009/073552; mailing date of Dec. 3, 2009; Huawei Tech Co., Ltd. et al.

European Patent Office Communication regarding the European search report pursuant to Rule 62 EPC, the supplemental European search report (Art. 153(7) EPC) and the European search opinion, mailed Apr. 23, 2012.

* cited by examiner

CALL CONTROL METHOD, DEVICE, AND SYSTEM

CROSS-REFERENCE TO RELATED APPLICATION

The application is a continuation of International Application No. PCT/CN2009/073552 filed on Aug. 27, 2009, which claims priority to Chinese Patent Application No. 200810189486.2, filed on December 29, and both of which are hereby incorporated by reference in their entireties.

FIELD OF THE TECHNOLOGY

The present invention relates to the field of communication, and more particularly to a call control method, device, and system.

BACKGROUND OF THE INVENTION

Currently, the "unified communication" technology has been applied in the field of communication. The unified communication refers to a new communication mode which integrates the computer technology with the conventional communication technology, that is, integrates a computer network and a conventional communication network on the same network platform to realize various application services such as phone calls, fax, data transmission, audio-video conferences, call centers, and real-time communication. The existing unified communication technology has realized the Click-to-Dial service. That is to say, a click-to-call request is initiated to a server by entering a calling number and a called number into computer software (a client); upon receiving the request, the server instructs a softswitch to call the calling party and the called party, and then the softswitch connects the conversation between both parties. During the call, the softswitch notifies the server of call state information, and the server notifies the client of displaying the call state information.

In the process of implementing the unified communication, the inventor found that the prior art at least has the following problem: the client can only initiate a call but cannot control the subsequent call.

SUMMARY OF THE INVENTION

The present invention is directed to a method, a device, and a system for realizing unified communication, which enable a client to control a call.

In order to achieve the above objective, the following technical solutions are adopted in embodiments of the present invention.

The present invention provides a call control method, which includes the following steps.

A call identification and call state information of a call that a number-binding client participates in are sent to the client.

A control request including the call identification and a control instruction and sent by the client according to the call identification and the call state information is received.

The control request including the call identification and the control instruction is sent to a softswitch equipment, so that the softswitch equipment controls the call corresponding to the call identification according to the control instruction.

The present invention provides a call control method, which includes the following steps.

A call identification and call state information of a call that a client participates in are sent to an application server, so that the application server sends the call identification and the call state information of the call to the client.

A control request including the call identification and a control instruction and sent by the application server is received.

The call corresponding to the call identification is controlled according to the control instruction in the control request.

The present invention provides an application server, which includes a first information exchange module, a first control request receiving module, and a first control module.

The first information exchange module is adapted to send to a client a call identification and call state information of a call that the number-binding client participates in.

The first control request receiving module is adapted to receive a control request including the call identification and a control instruction and sent by the client according to the call identification and the call state information.

The first control module is adapted to send the control request including the call identification and the control instruction to a softswitch equipment, so that the softswitch equipment controls the call corresponding to the call identification according to the control instruction.

The present invention provides a softswitch equipment, which includes a second information exchange module, a second control request receiving module, and a second control module.

The second information exchange module is adapted to send to an application server a call identification and call state information of a call that a client participates in, so that the application server sends the call identification and the call state information of the call to the client.

The second control request receiving module is adapted to receive a control request including the call identification and a control instruction and sent by the application server.

The second control module is adapted to control the call corresponding to the call identification according to the control instruction in the control request.

The present invention provides a client, which includes a receiving module and a control request sending module.

The receiving module is adapted to receive a call identification and call state information sent by an application server. The call identification is a call identification corresponding to a call that a number-binding client participates in.

The control request sending module is adapted to send a control request including the call identification and a control instruction to the application server when the call state information indicates that the call is being made, so that the application server notifies a softswitch equipment of controlling the call corresponding to the call identification.

The present invention provides a call control system, which includes an application server and a softswitch equipment.

The application server is adapted to send to the client a call identification and call state information of a call that a number-binding client participates in, wherein the call identification and the call state information of the call is received from the softswitch equipment; and send to the softswitch equipment a control request including the call identification and a control instruction according to the call identification and the call state information, wherein the control request received from the client.

The softswitch equipment is adapted to establish the call, send the call identification and the call state information, and control the call according to the control request from the client.

In the call control method, device, and system provided according to the embodiments of the present invention, a call identification and call state information of a call that a number-binding client participates in are sent to the client, the client may send a control request including the call identification to a network side, and the network side identifies the call that the control request of the client is directed to according to the call identification and controls the call.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

A method, a device, and a system for realizing unified communication according to embodiments of the present invention will be described in detail below with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
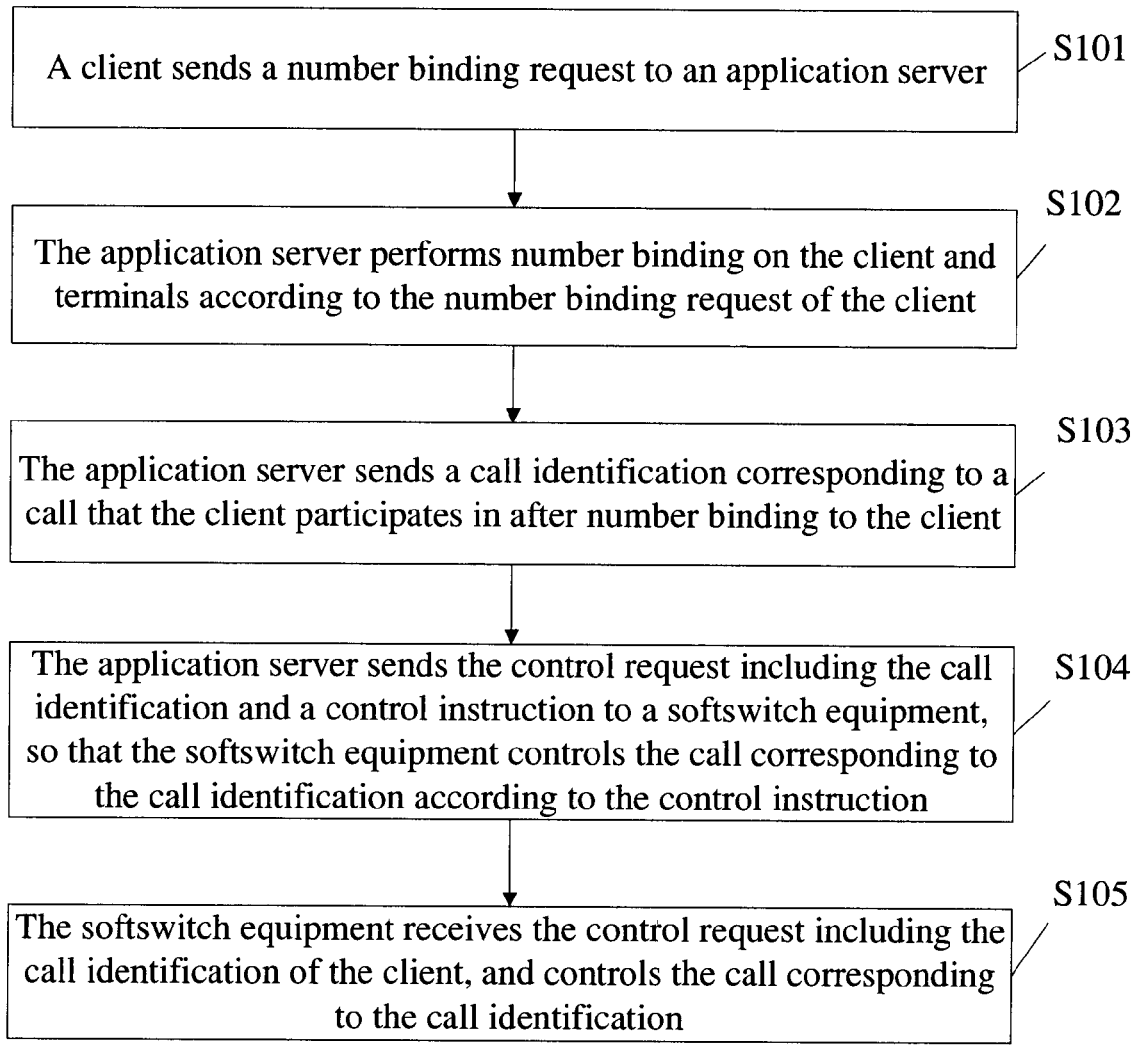
FIG. 1 is a flow chart of a call control method according to an embodiment of the present invention.

A call control method according to an embodiment of the present invention is shown in FIG. 1, which includes the following steps.

In step S101, a client sends a number binding request to an application server.

The number binding request carries a client number and terminal numbers bound to the client.

In step S102, the application server performs number binding on the client and terminals according to the number binding request of the client, that is, performs mapping storage on the client number and the terminal numbers required to be bound. After the performance of number binding, the client is regarded as a number-binding client.

The client mentioned in this embodiment refers to a computer communicating with other terminals on a communication network through functional software or other intelligent terminals having the similar function. The client first sends a number binding request to the application server on the network side. The number binding request includes a client number and terminal numbers bound to the client. The application server performs number binding on the client and the terminals. An ordinary terminal cannot control a call that the terminal does not participate in, but the client according to the embodiment of the present invention has call control capability, that is, the client performs call control on the terminals bound to the client through number binding on the client and other terminals.

In step S103, the application server sends a call identification corresponding to a call that the number-binding client participates in to the client.

The number-binding client participates in a call mainly in the following two situations. In the first situation, a bound terminal of the client is selected on the client as a calling party to initiate a call to the application server on the network side, and the called party is another terminal. In the second situation, the client number serves as the called party to receive a call sent from the application server on the network side.

In step S104, the client sends a control request including the call identification to the application server, and the application server sends the control request including the call identification and a control instruction to a softswitch equipment, so that the softswitch equipment controls the call corresponding to the call identification according to the control instruction.

In this embodiment, the network side sends a call identification corresponding to a call that the client participates in to the client, and the client can control the call after knowing the call identification corresponding to the call.

In step S105, the softswitch equipment receives the control request including the call identification from the client, and controls the call corresponding to the call identification.

The softswitch equipment first obtains by parsing the control instruction and the call identification from the received control request, then searches for the call corresponding to the call identification in calls established by the equipment, and executes the control instruction on the call after searching out the call.

In this embodiment, a control request sent by the client includes a call identification, and the network side determines a call that a control instruction is directed to according to the call identification and executes the control instruction on the call.

In this embodiment, the client is bound to terminals, and when the client participates in a call, the network side sends a call identification corresponding to the current call to the client according to binding relations between the client and the terminals. In this way, corresponding relations between calls and call identifications are established, and when the client needs to control a call, the client may send a control request including a call identification to the network side, and the network side identifies the call that the control request of the client is directed to according to the call identification and then controls the call, which avoids the problem in the prior art that a call cannot be interrupted once initiated, simplifies the entire system process, and saves system and network resources as well as users' time.

Figures 1, 2:
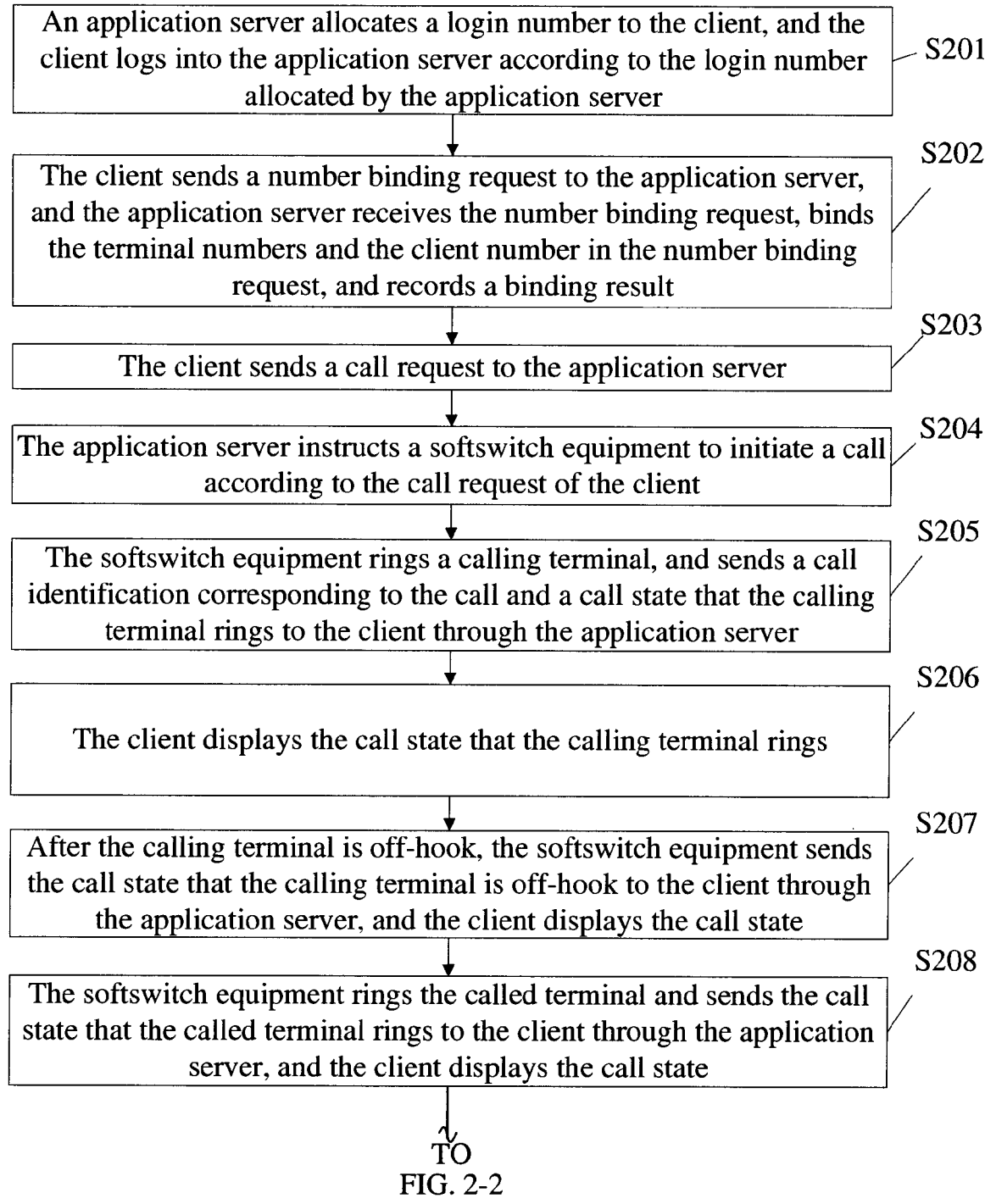
FIG. 2 is a flow chart of a call control method according to an embodiment of the present invention.
Figure 2:
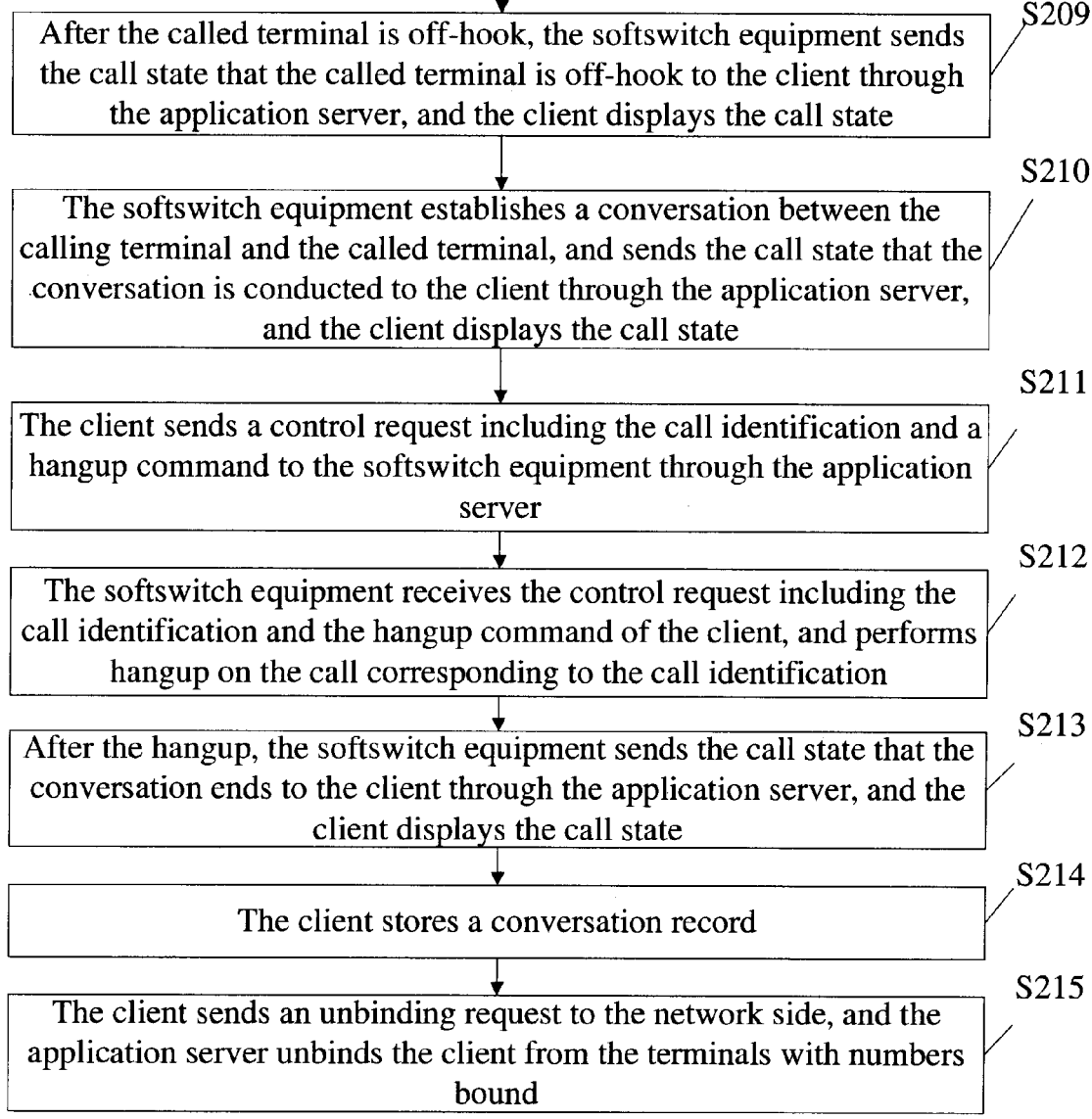

A call control method according to an embodiment of the present invention is shown in FIG. 2. In the embodiment of the present invention, a client initiates a call in which the calling party is a terminal bound to the client and the called party is any terminal to a network side. The method specifically includes the following steps.

In step S201, an application server allocates a login number to the client. The client logs into the application server according to the login number allocated by the application server.

Before the client logs into the application server, the application server needs to first allocate a login number to the client as a unified number made public by the client, and this process is equivalent to a subscription process of the client. Further, the application server further allocates a login password to the client while allocating the login number to the client.

Figure 2A:
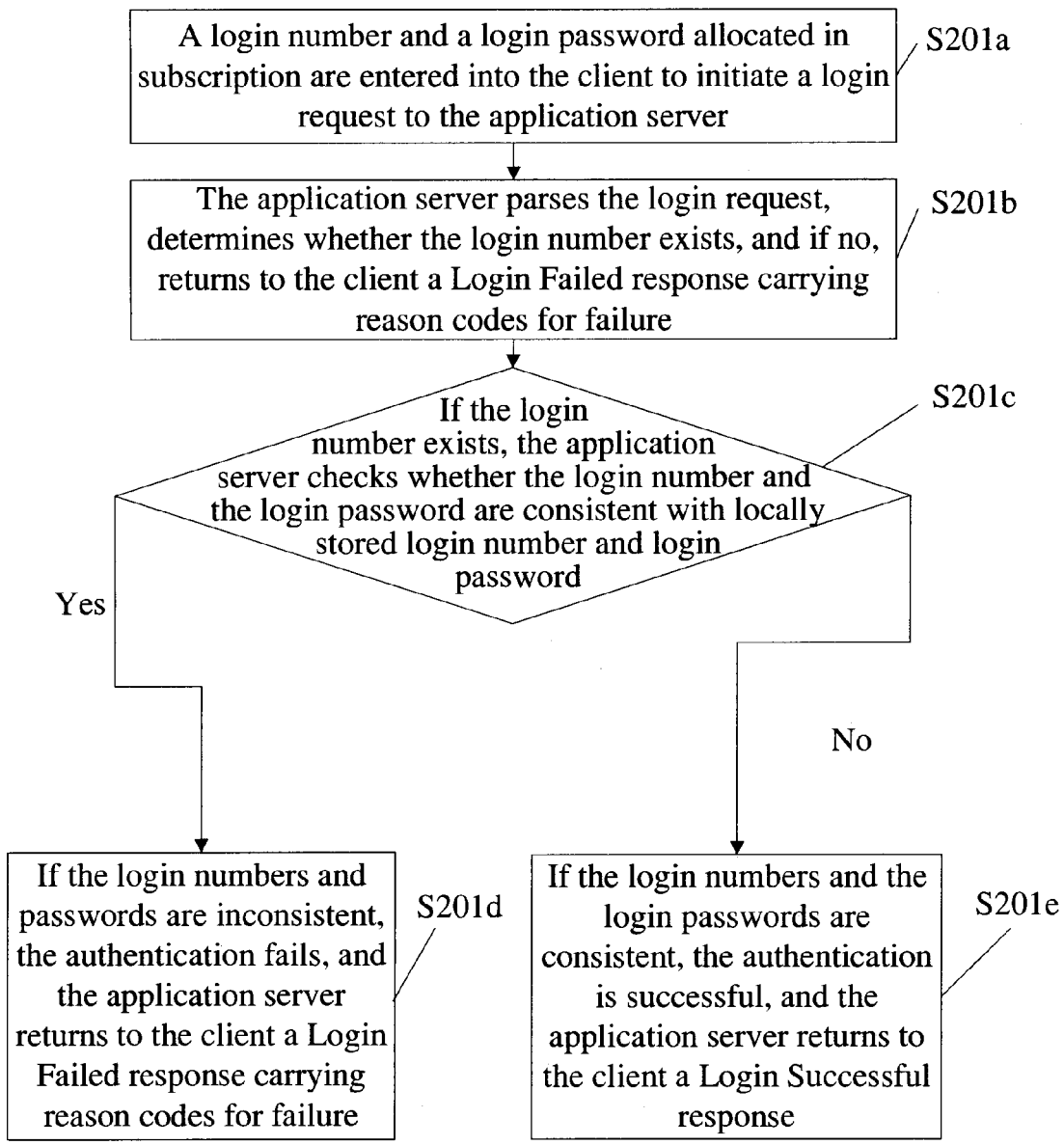
FIG. 2a is a flow chart of Step S201 in the call control method according to the embodiment of the present invention.

As shown in FIG. 2a, the Step S201 may further include the following steps.

In step S201a, a login number and a login password allocated in subscription are entered into the client to initiate a login request to the application server. The login request carries the login number and encrypted password information.

In step S201b, the application server parses the login request and determines whether the login number exists, and if no, returns to the client a Login Failed response carrying reason codes for failure.

In step S201c, if the login number exists, the application server further needs to check whether the login number and the login password are consistent with locally stored login number and login password.

In step S201d, if the login number and the login password are inconsistent with the locally stored login number and login password, the authentication fails, and the application server returns to the client a Login Failed response carrying reason codes for failure.

In step S201e, if the login number and the login password are consistent with the locally stored login number and login password, the authentication is successful, and the application server returns to the client a Login Successful response. After logging in successfully, the client may perform Step S202.

In step S202, the client sends to the application server a number binding request carrying a client number and one or more terminal numbers to be bound, and the application server receives the number binding request, and performs mapping storage on the terminal numbers and the client number in the number binding request. Multiple terminal numbers may be bound to one client at the same time.

Figure 2B:
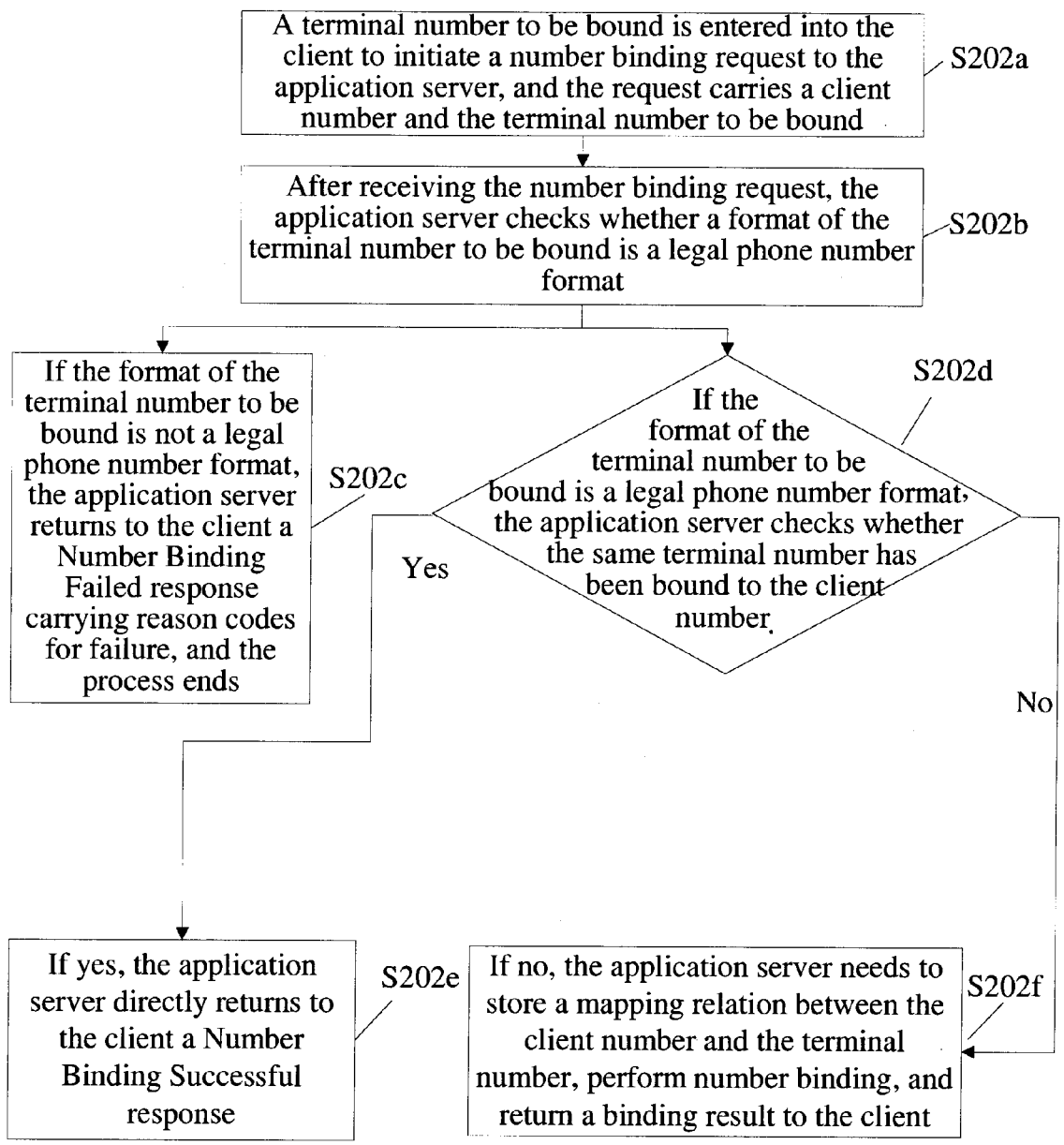
FIG. 2b is a flow chart of Step S202 in the call control method according to the embodiment of the present invention.

As shown in FIG. 2b, Step S202 may further include the following steps.

In step S202a, a terminal number to be bound is entered into the client to initiate a number binding request to the application server. The number binding request carries a client number and the terminal number to be bound.

In step S202b, after receiving the number binding request, the application server checks whether a format of the terminal number to be bound is a legal phone number format.

In step S202c, if the format of the terminal number to be bound is not a legal phone number format, the application server returns to the client a Number Binding Failed response carrying reason codes for failure, and the process ends.

In step S202d, if the format of the terminal number to be bound is a legal phone number format, the application server checks whether the same terminal number has been bound to the client number.

In step S202e, if the same terminal number has been bound to the client number, the application server directly returns to the client a Number Binding Successful response, and then Step 203 is performed.

In step S202f, if the same terminal number has not been bound to the client number, the application server needs to store a mapping relation between the client number and the terminal number, perform number binding, and return a binding result to the client, and then Step 203 is performed.

The format of mapping relations between the client number and the terminal numbers is similar to that shown in Table 1.

TABLE 1

| Client number: 518888 | | |
|---|---|---|
| Sequence number | Terminal numbers that have been bound | Relevant attributes . . . |
| 1 | 5714 | |
| 2 | 87666677 | |
| 3 | 138xxxxxxxx | |

Note:
the table contains a client number, information of terminal numbers (which may be fixed phone numbers or mobile phone numbers) bound to the client number, and relevant attributes.

In step S203, the client sends a call request to the application server. The call request carries the client number, and calling number which is one of the terminal numbers bound to the client, and called terminal number.

In step S204, the application server instructs a softswitch equipment to initiate a call according to the call request of the client.

In step S205, the softswitch equipment rings a calling terminal, and sends to the client through the application server a call identification corresponding to the current call and call state information that the calling terminal rings.

In step S206, the client displays the call state information that the calling terminal rings.

In step S207, after the calling terminal is off-hook, the softswitch equipment sends the call state information that the calling terminal is off-hook to the client through the application server, and the client displays the call state information that the calling terminal is off-hook.

In step S208, the softswitch equipment rings the called terminal and sends the call state information that the called terminal rings to the client through the application server, and the client displays the call state information that the called terminal rings.

In step S209, after the called terminal is off-hook, the softswitch equipment sends the call state information that the called terminal is off-hook to the client through the application server, and the client displays the call state information that the called terminal is off-hook.

In step S210, the softswitch equipment establishes a conversation between the calling terminal and the called terminal, and sends the call state information that the conversation is conducted to the client through the application server, and the client displays the call state information that the conversation is conducted.

In step S211, the client sends a control request including the call identification and a hangup command to the softswitch equipment through the application server.

In step S212, the softswitch equipment receives the control request including the call identification and the hangup command from the client, and performs hangup on the call corresponding to the call identification.

The softswitch equipment first obtains by parsing the hangup command and the call identification from the received control request, then searches for the call corresponding to the call identification in calls established by the equipment, and performs hangup on the call after searching out the call.

In step S213, after the hangup, the softswitch equipment sends the call state information that the conversation ends to the client through the application server, and the client displays the call state information that the conversation ends.

In step S214, the client stores a conversation record.

In step S215, the client sends an unbinding request to the network side, and the application server unbinds the client from the terminals with numbers bound.

In this embodiment, the client is bound to terminals. When the client initiates a call in which the calling party is a terminal bound to the client and the called party is any terminal to the network side, the network side sends a call identification corresponding to the current call to the client according to binding relations between the client and the terminals, and meanwhile initiates the call to the calling terminal. After the calling terminal is off-hook, the call is initiated to the called terminal. In this way, the corresponding relation between the call and the call identification is established. When the client needs to control the call, the client may send a control request including the call identification to the network side, and the network side identifies the call that the control request of the client is directed to according to the call identification and controls the call.

Additionally, in this embodiment, call state information is sent to the client through the application server, so that the client can monitor the call state information better.

Furthermore, in this embodiment, since the client monitors the call state information during the whole course, the client can store a conversation record based thereon for later search.

Finally, to facilitate the use of users, the bound client and terminals may be unbound.

Figure 3A:
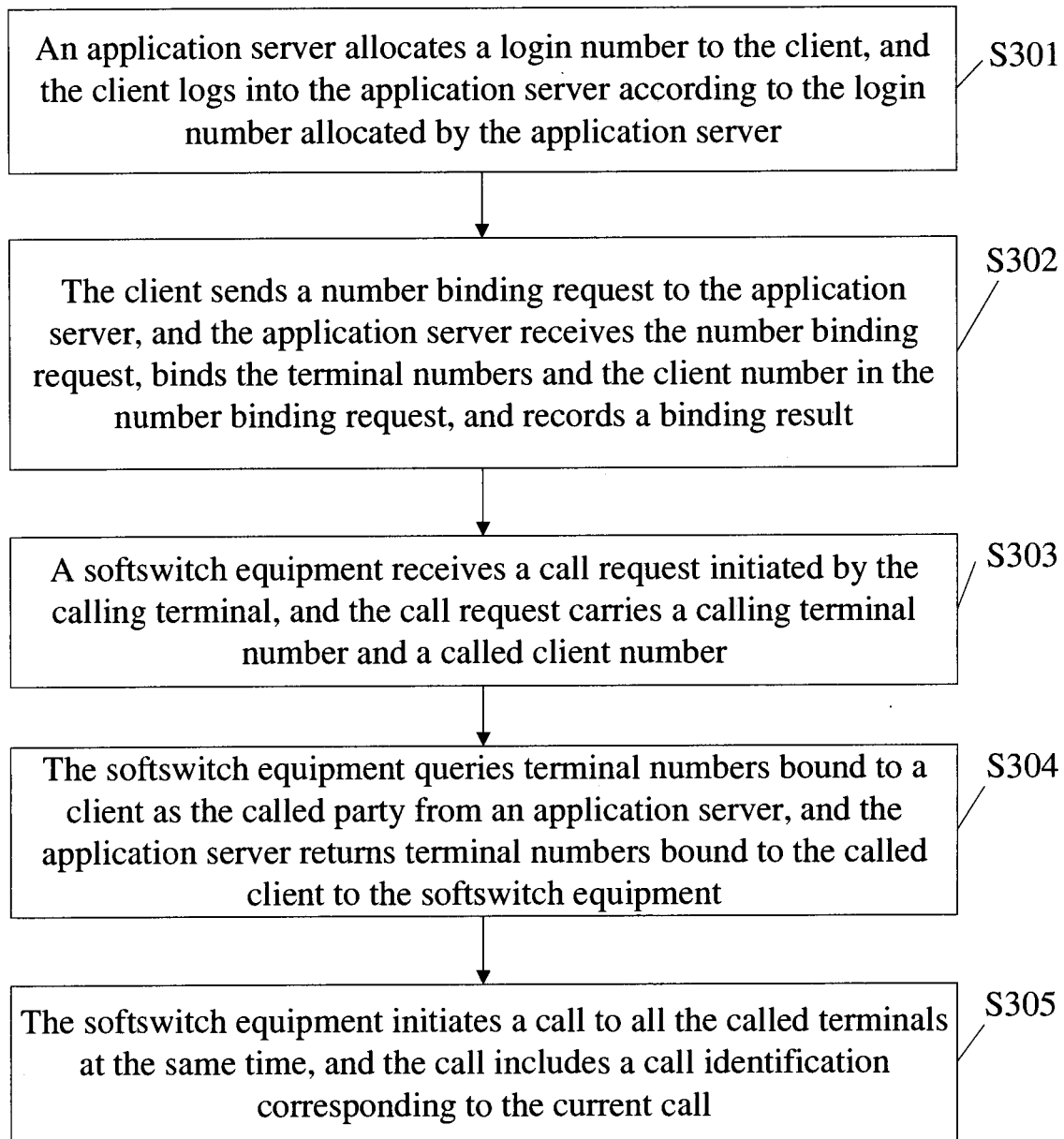
FIG. 3 is a flow chart of a call control method according to an embodiment of the present invention.
Figure 3B:
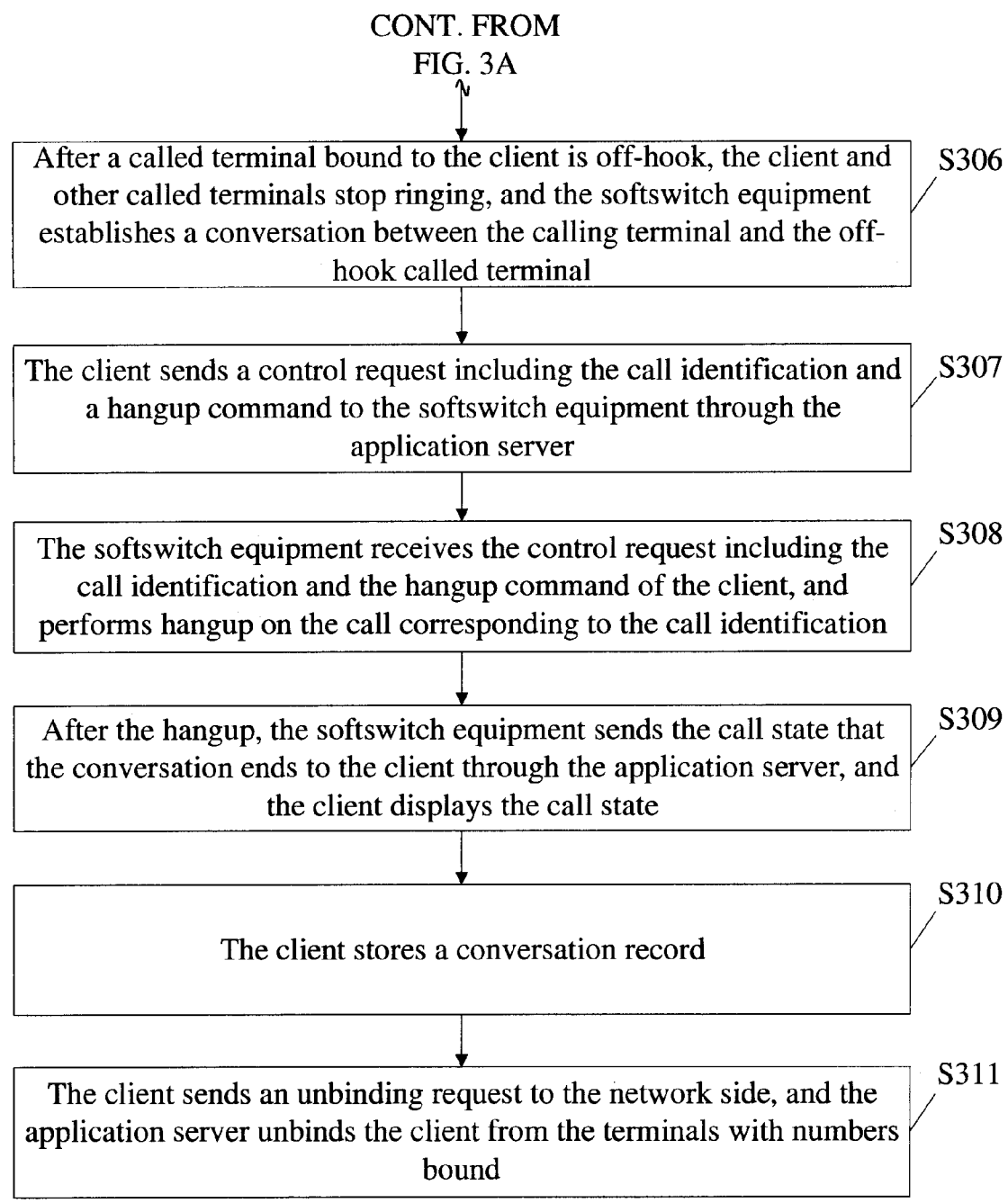

A call control method according to an embodiment of the present invention is shown in FIG. 3. In this embodiment, a call in which any terminal is the calling party and the called party is a client number is initiated. The method specifically includes the following steps.

Steps S301 to S302 are the same as Steps 201 to 202, and will not be described in detail herein again.

In step S303, a softswitch equipment receives a call request initiated by the calling terminal. The call request carries a calling terminal number and a client number serving as the called party.

In step S304, the softswitch equipment queries terminal numbers bound to the client serving as the called party from an application server, and the application server returns to the softswitch equipment all terminal numbers bound to the client serving as the called party.

In step S305, the softswitch equipment initiates a call to the client and all the called numbers bound to the client at the same time. The call includes a call identification corresponding to the current call.

In step S306, after a called terminal bound to the client is off-hook, the client and other called terminals stop ringing, and the softswitch equipment establishes a conversation between the calling terminal and the off-hook called terminal.

After the softswitch equipment initiates the call to the client and all the called numbers bound to the client at the same time, the off-hook of the client or the off-hook of a terminal bound to the client is actually equivalent to the start of a conversation between the calling party and the called party. After detecting that a called terminal is off-hook, the softswitch equipment terminates ringing of other called terminals. Afterwards, the softswitch equipment sends call state information that the calling party and the called party conduct the conversation to the client for display.

Steps S307 to S311 are the same as Steps S211 to S215, and will not be described herein again.

In this embodiment, the client is bound to terminals, and when any terminal is the calling party and the called party is a client number, the network side sends a call identification corresponding to the current call to the client according to binding relations between the client and the terminals. In this way, the corresponding relation between the call and the call identification is established. When the client needs to control the call, the client may send a control request including the call identification and a control instruction to the network side, and the network side identifies the call that the control request of the client is directed to according to the call identification and controls the call.

Besides, in this embodiment, when the client is the called party, the softswitch equipment initiates a call to the client and all terminals bound to the client at the same time. In this way, when a user intends to search for a called user but cannot determine the position where the called user can answer, all terminals ring at the same time as long as the user dials a client number, so that the person is found rapidly with enhanced efficiency without remembering all terminal numbers.

Additionally, in this embodiment, call state information is sent to the client through the application server, so that the client can know the current state of the call to monitor the call state information better.

Furthermore, in this embodiment, since the client monitors the call state information during the whole course, the client can store a conversation record based thereon for later search.

Finally, to facilitate the use of users, the bound client and terminals may be unbound.

Figure 4:
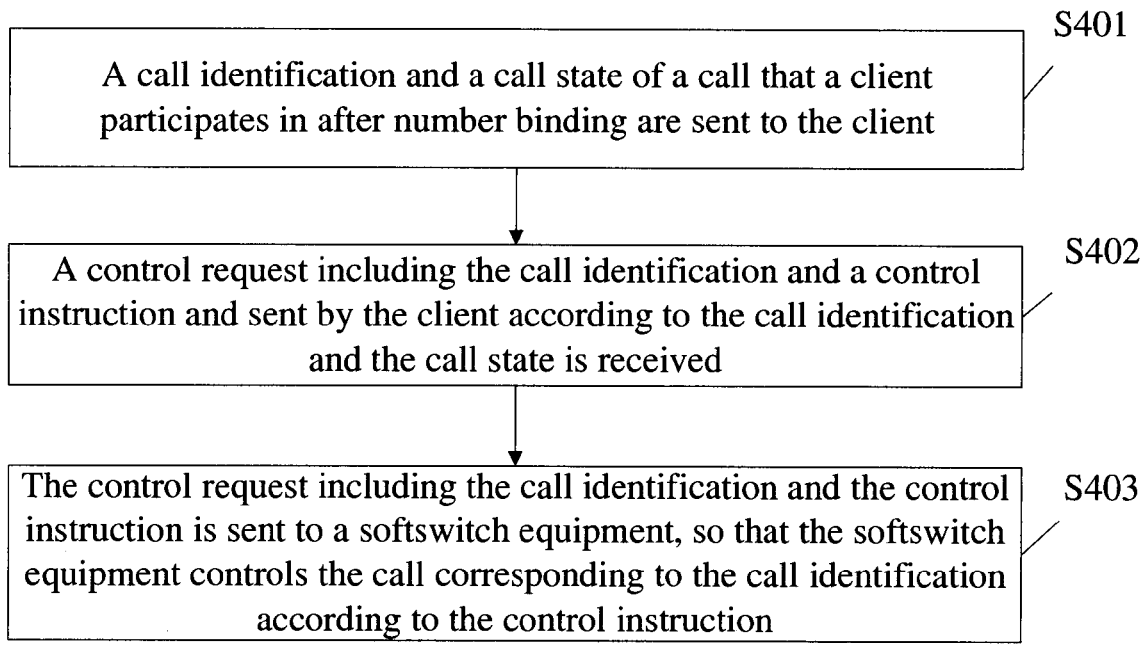
FIG. 4 is a flow chart of a call control method according to an embodiment of the present invention.

A call control method according to an embodiment of the present invention is shown in FIG. 4, which includes the following steps.

In step S401, a call identification and call state information of a call that a number-binding client participates in are sent to the client.

In step S402, a control request including the call identification and a control instruction and sent by the client according to the call identification and the call state information is received.

In step S403, the control request including the call identification and the control instruction is sent to a softswitch equipment, so that the softswitch equipment controls the call corresponding to the call identification according to the control instruction.

In the above embodiment of the call control method on the application server side, the client is bound to terminals, corresponding relations between calls and call identifications are established, and the network side identifies the call that a control request of the client is directed to according to the call identification and controls the call. When the client is the called party, the softswitch equipment initiates a call to the client and all terminals bound to the client at the same time. In this way, when a user intends to search for a called user but cannot determine the position where the called user can answer, all terminals ring at the same time as long as the user dials a client number, so that the person is found rapidly with enhanced efficiency without remembering all terminal numbers.

Figure 5:
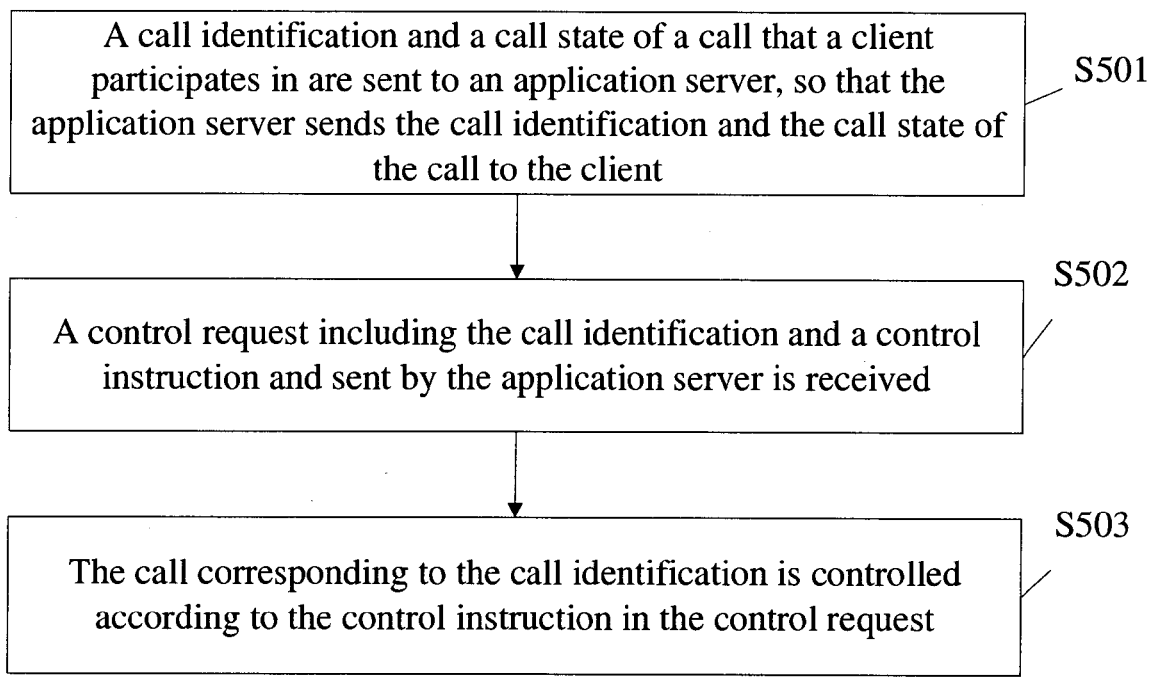
FIG. 5 is a flow chart of a call control method according to an embodiment of the present invention.

A call control method according to an embodiment of the present invention is shown in FIG. 5, which includes the following steps.

In step S501, a call identification and call state information of a call that a client participates in are sent to an application server, so that the application server sends the call identification and the call state information of the call to the client.

In step S502, a control request including the call identification and a control instruction and sent by the application server is received.

In step S503, the call corresponding to the call identification is controlled according to the control instruction in the control request.

In this embodiment of the call control method on the softswitch equipment side, the client is bound to terminals, corresponding relations between calls and call identifications are established, and when the client needs to control a call, the client may send a control request including a call identification, and the network side identifies a call that the control request of the client is directed to according to the call identification and controls the call, which avoids the problem in the prior art that a call cannot be interrupted once initiated, simplifies the entire system process, and saves system and network resources as well as users' time.

Figure 6:
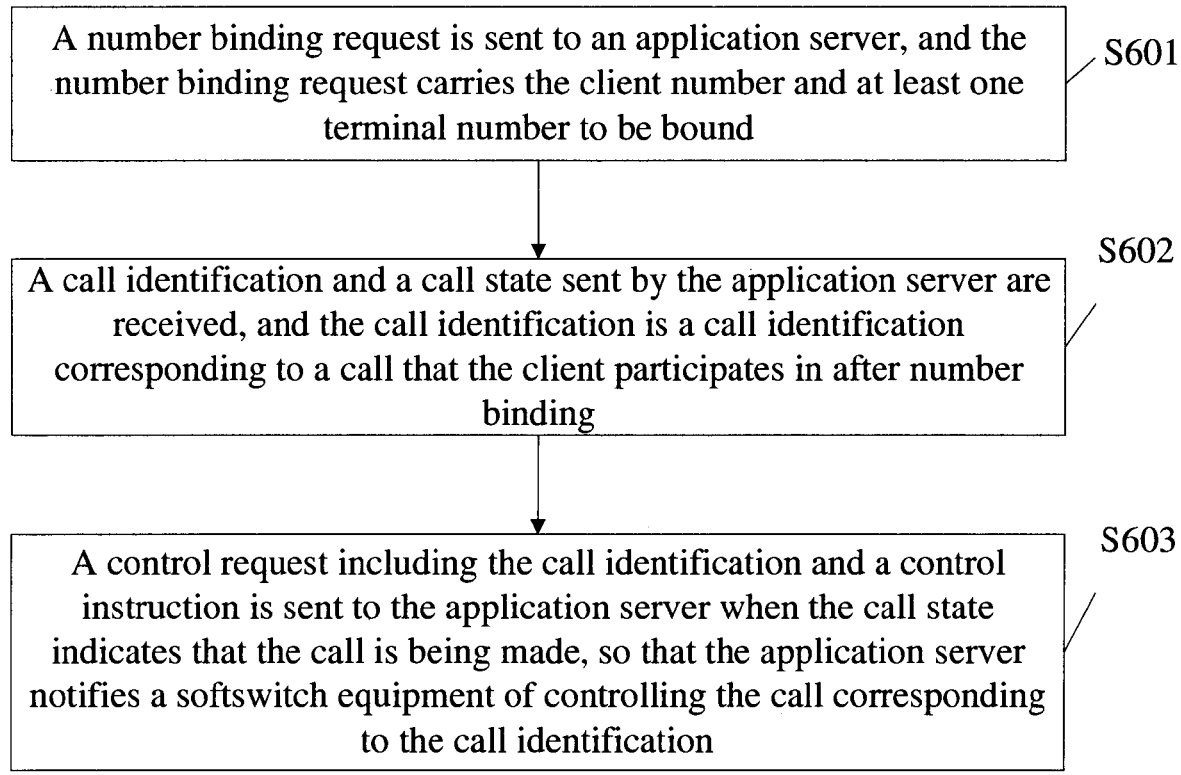
FIG. 6 is a flow chart of a call control method according to an embodiment of the present invention.

A call control method according to an embodiment of the present invention is shown in FIG. 6, which includes the following steps.

In step S601, a number binding request is sent to an application server. The number binding request carries a client number and at least one terminal number to be bound.

In step S602, a call identification and call state information sent by the application server are received. The call identification is a call identification corresponding to a call that the number-binding client participates in.

In step S603, a control request including the call identification and a control instruction is sent to the application server when the call state information indicates that the call is being made, so that the application server notifies a softswitch equipment of controlling the call corresponding to the call identification.

In the above embodiment of the call control method on the client side, a call identification and call state information are sent to the client, the client may send a control request including the call identification to the network side, and the network side identifies a call that the control request of the client is directed to according to the call identification and controls the call, which avoids the problem in the prior art that a call cannot be interrupted once initiated, simplifies the entire system process, and saves system and network resources as well as users' time.

Figure 7:
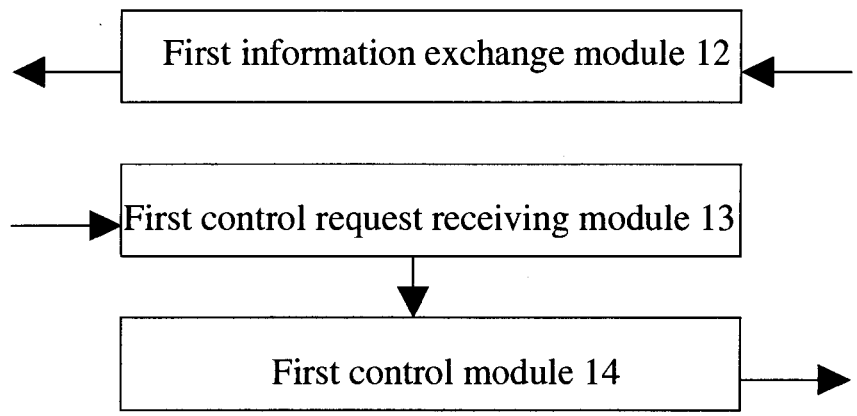
FIG. 7 is a schematic structural view of an application server as a call control device according to an embodiment of the present invention.

An application server as a call control device according to an embodiment of the present invention is shown in FIG. 7, which includes a first information exchange module 12, a first control request receiving module 13, and a first control module 14.

The first information exchange module 12 is adapted to send a call identification and call state information of a call that a number-binding client participates in to a client.

The first control request receiving module 13 is adapted to receive a control request including the call identification and a control instruction and sent by the client according to the call identification and the call state information.

The first control module 14 is adapted to send the control request including the call identification and the control instruction to a softswitch equipment, so that the softswitch equipment controls the call corresponding to the call identification according to the control instruction.

The call identification, call state information, and control request involved as well as the specific working process involved in this embodiment can refer to the relevant contents disclosed in the embodiments involved in FIGS. 1 and 2, and will not be described herein again.

In the above embodiment, the client is bound to terminals, corresponding relations between calls and call identifications are established, and the network side identifies a call that a control request of a client is directed to according to the call identification and controls the call. When the client is the called party, the softswitch equipment initiates a call to the client and all terminals bound to the client at the same time. In this way, when a user intends to search for a called user but cannot determine the position where the called user can answer, all terminals ring at the same time as long as the user dials a client number, so that the person is found rapidly with enhanced efficiency without remembering all terminal numbers.

Figure 8:
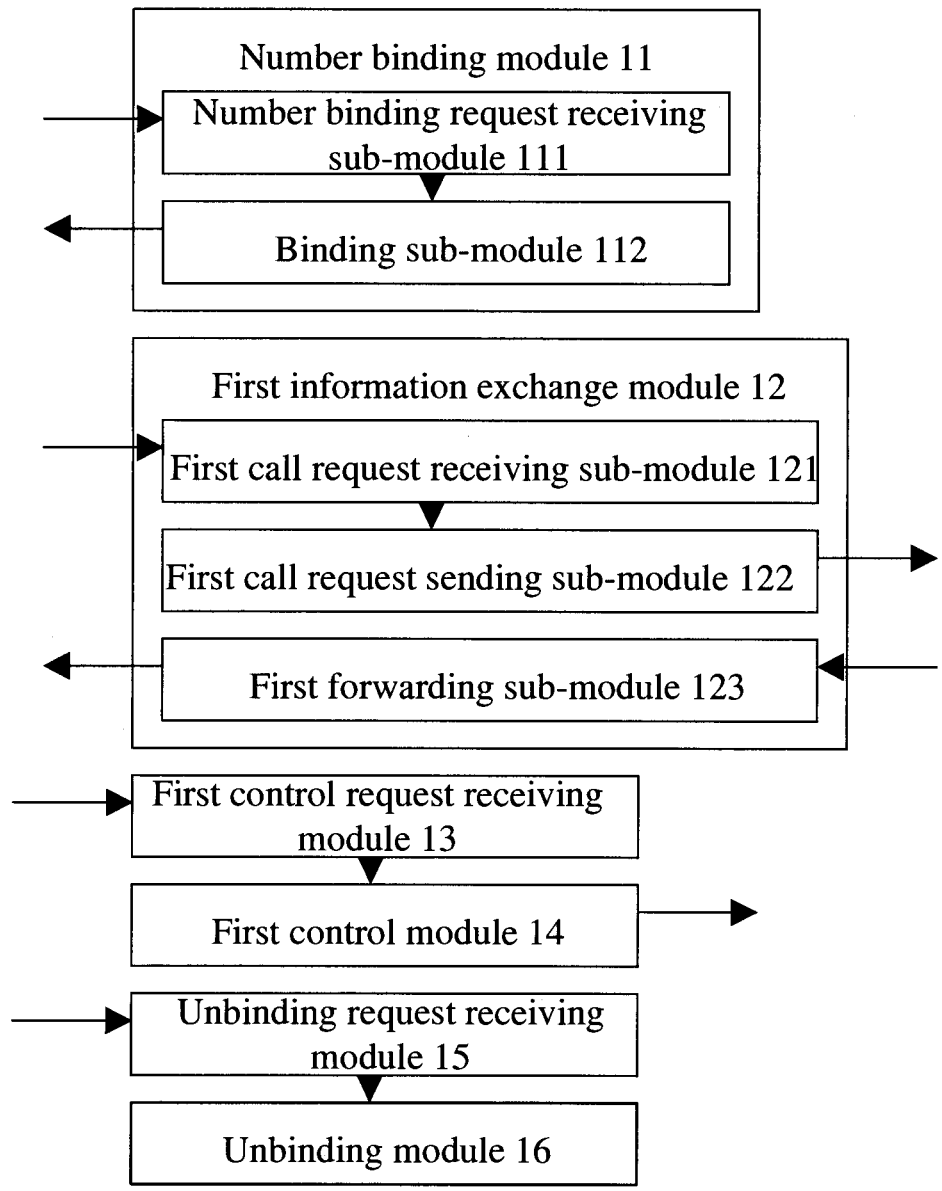
FIG. 8 is a schematic structural view of an application server as a call control device according to an embodiment of the present invention.

An application server as a call control device according to an embodiment of the present invention is shown in FIG. 8, which includes a number binding module 11, a first information exchange module 12, a first control request receiving module 13, a first control module 14, an unbinding request receiving module 15, and an unbinding module 16.

The number binding module 11 is adapted to perform number binding on a client and terminals according to a number binding request of the client.

The first information exchange module 12 is adapted to send a call identification and call state information of a call that the number-binding client participates in to the client.

The first control request receiving module 13 is adapted to receive a control request including the call identification and a control instruction and sent by the client according to the call identification and the call state information.

The first control module 14 is adapted to send the control request including the call identification and the control instruction to a softswitch equipment, so that softswitch equipment controls the call corresponding to the call identification according to the control instruction.

The unbinding request receiving module 15 is adapted to receive an unbinding request sent by the client.

The unbinding module 16 is adapted to unbind a client number from bound terminal numbers.

The number binding module 11 includes a number binding request receiving sub-module 111 and a binding sub-module 112.

The number binding request receiving sub-module 111 is adapted to receive the number binding request of the client. The number binding request carries the client number and at least one terminal number to be bound.

The binding sub-module 112 is adapted to bind the at least one terminal number and the client number.

Besides, the first information exchange module 12 includes a first call request receiving sub-module 121, a first call request sending sub-module 122, and a first forwarding sub-module 123.

The first call request receiving sub-module 121 is adapted to receive a call request of the client. The call request carries the client number, and a calling number which is one of terminal numbers bound to the client, and a called terminal number.

The first call request sending sub-module 122 is adapted to send the call request to the softswitch equipment, so that the softswitch equipment connects the call according to the call request.

The first forwarding sub-module 123 is adapted to receive the call identification and the call state information sent by the softswitch equipment, and send the call identification and the call state information to the client.

Figure 9:
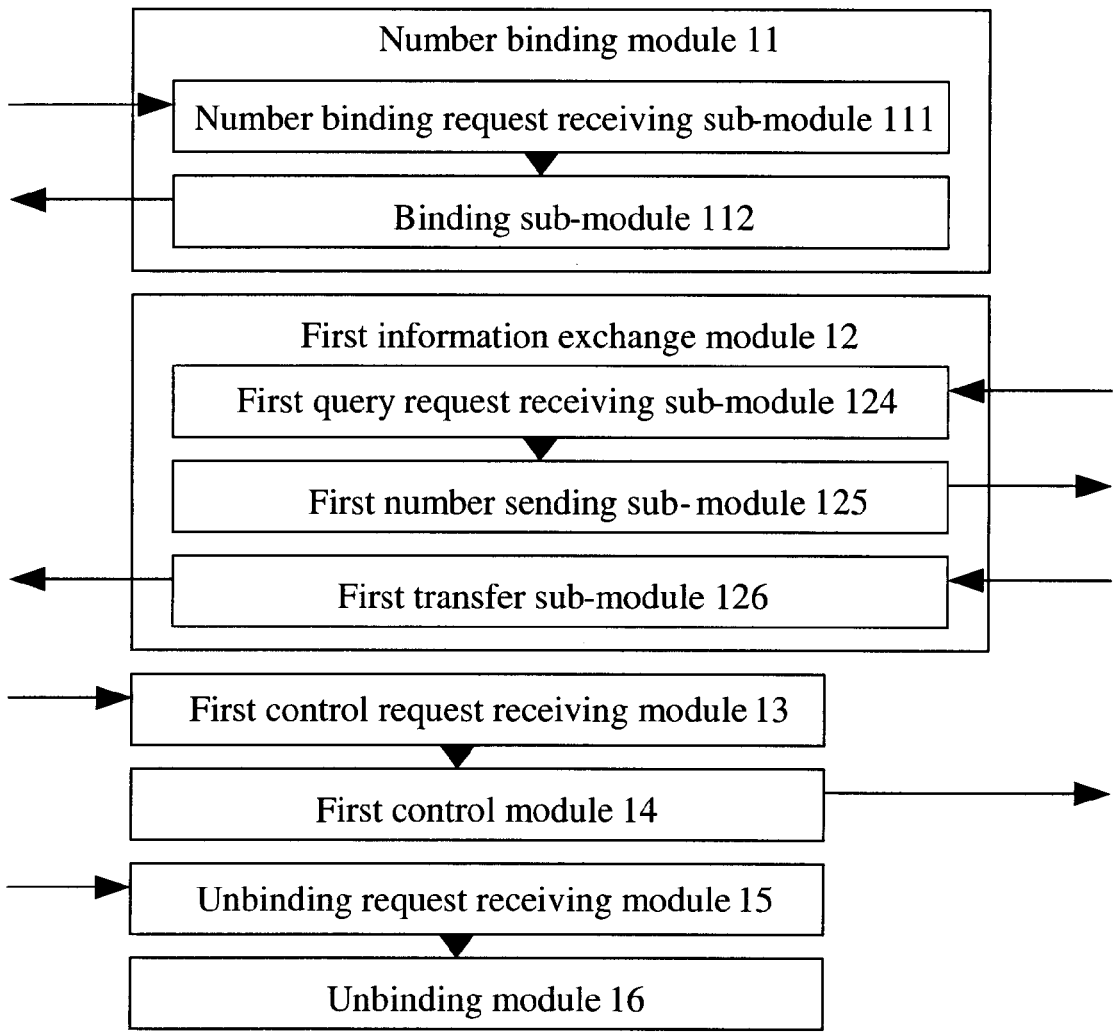
FIG. 9 is a schematic structural view of an application server as a call control device according to an embodiment of the present invention.

Or, as shown in FIG. 9, the first information exchange module 12 includes a first query request receiving sub-module 124, a first number sending sub-module 125, and a first transfer sub-module 126.

The first query request receiving sub-module 124 is adapted to receive a terminal number query request sent by the softswitch equipment. The terminal number query request carries the client number serving as the called party.

The first number sending sub-module 125 is adapted to return the terminal numbers bound to the client serving as the called party to the softswitch equipment according to the client number serving as the called party, so that the softswitch equipment connects the call according to the client number serving as the called party and the terminal numbers bound to the client serving as the called party.

The first transfer sub-module 126 is adapted to receive the call identification and the call state information sent by the softswitch equipment, and send the call identification and the call state information to the client.

The call identification, call state information, and control request involved as well as the specific working process involved in this embodiment can refer to the relevant contents disclosed in the embodiments involved in FIGS. 1 and 2, and will not be described herein again.

Figure 10:
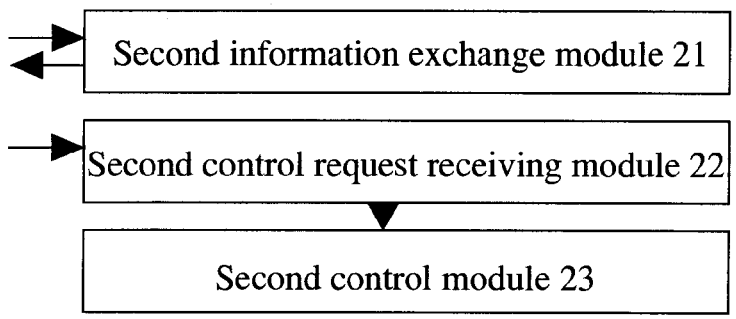
FIG. 10 is a schematic structural view of a softswitch equipment as a call control device according to an embodiment of the present invention.

A softswitch equipment as a call control device according to an embodiment of the present invention is shown in FIG. 10, which includes a second information exchange module 21, a second control request receiving module 22, and a second control module 23.

The second information exchange module 21 is adapted to send a call identification and call state information of a call that a client participates in to an application server, so that the application server sends the call identification and the call state information of the call to the client.

The second control request receiving module 22 is adapted to receive a control request including the call identification and a control instruction and sent by the application server.

The second control module 23 is adapted to control the call corresponding to the call identification according to the control instruction in the control request.

The call identification, call state information, and control request involved as well as the specific working process involved in this embodiment can be seen in the relevant contents disclosed in the embodiments involved in FIGS. 1 and 2, and will not be described herein again.

In this embodiment, the client is bound to terminals, corresponding relations between calls and call identifications are established, and when the client needs to control a call, the client may send a control request including a call identification, and the network side identifies a call that the control request of the client is directed to according to the call identification and controls the call, which avoids the problem in the prior art that a call cannot be interrupted once initiated, simplifies the entire system process, and saves system and network resources as well as users' time.

Figure 11:
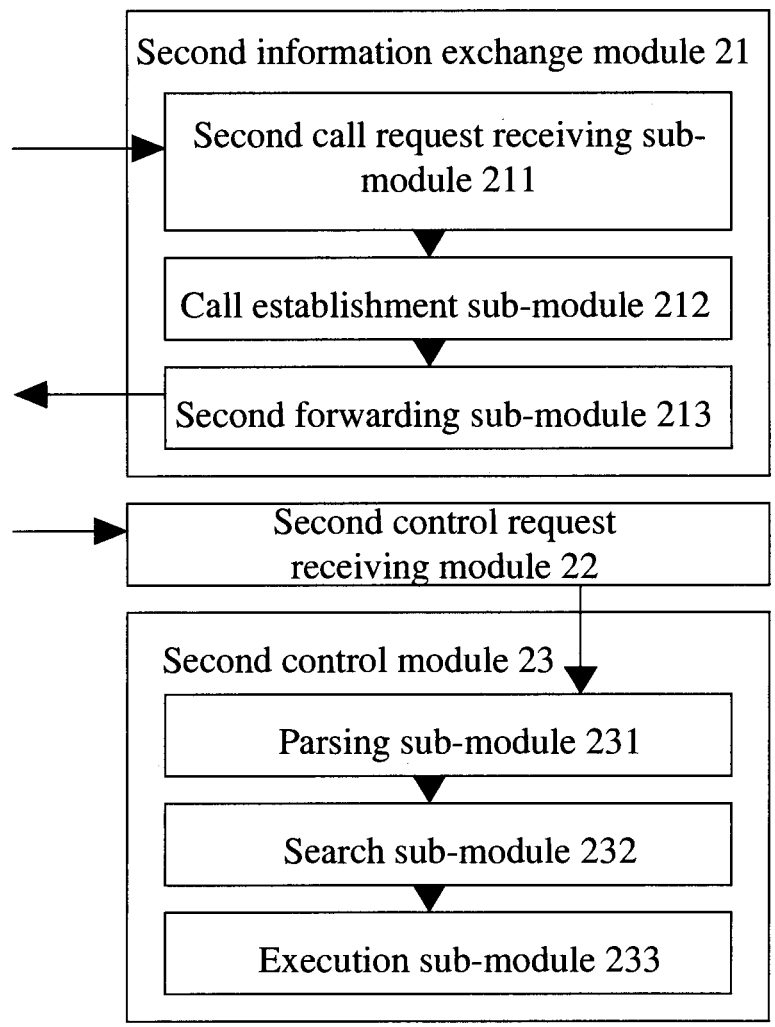
FIG. 11 is a schematic structural view of a softswitch equipment as a call control device according to an embodiment of the present invention.

A softswitch equipment as a call control device according to an embodiment of the present invention is shown in FIG. 11, which includes a second information exchange module 21, a second control request receiving module 22, and a second control module 23.

The second information exchange module 21 is adapted to send a call identification and call state information of a call that a client participates in to an application server, so that the application server sends the call identification and the call state information of the call to the client.

The second control request receiving module 22 is adapted to receive a control request including the call identification and a control instruction and sent by the application server.

The second control module 23 is adapted to control the call corresponding to the call identification according to the control instruction in the control request.

The second control module 23 includes a parsing sub-module 231, a search sub-module 232, and an execution sub-module 233.

The parsing sub-module 231 is adapted to obtain by parsing the control instruction and the call identification from the received control request.

The search sub-module 232 is adapted to search out the call corresponding to the call identification.

The execution sub-module 233 is adapted to execute the control instruction on the call.

Besides, the second information exchange module 21 includes a second call request receiving sub-module 211, a call establishment sub-module 212, and a second forwarding sub-module 213.

The second call request receiving sub-module 211 is adapted to receive the call request sent by the application server. The call request carries a client number and a calling number which is one of terminal numbers bound to the client and a called terminal number.

The call establishment sub-module 212 is adapted to establish a call from a calling terminal to a called terminal according to the call request.

The second forwarding sub-module 213 is adapted to send the call identification and the call state information of the call to the application server, so that the application server sends the call identification and the call state information of the call to the client.

Figure 12:
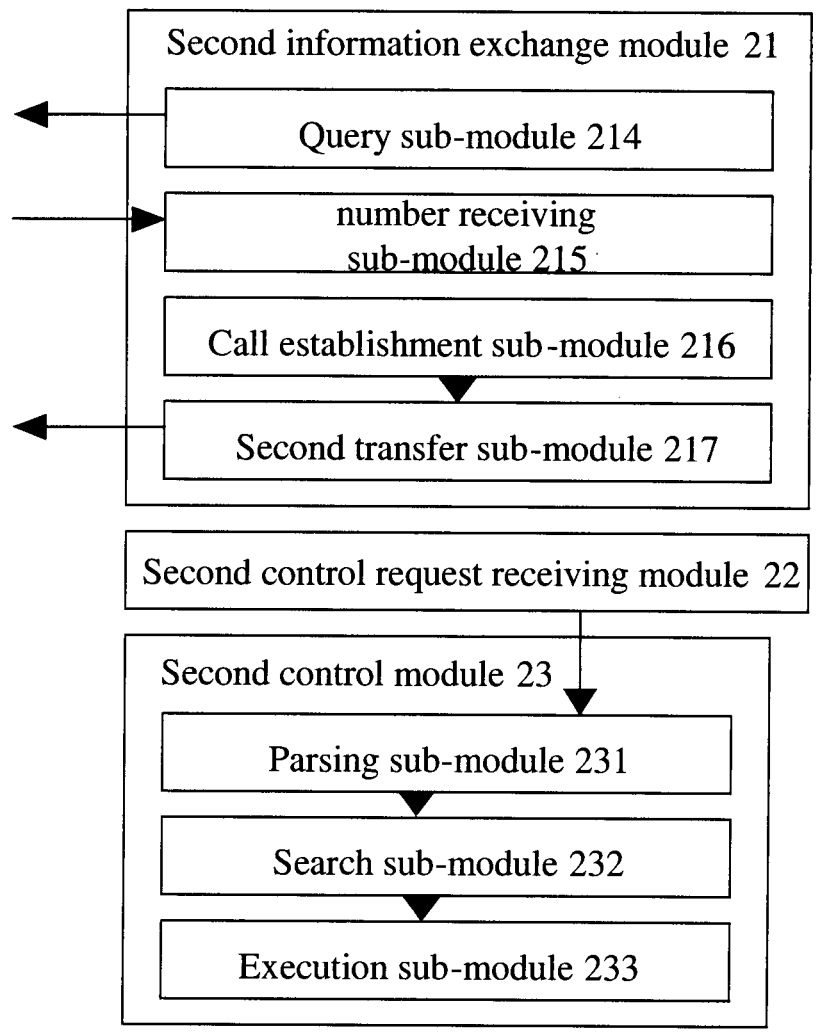
FIG. 12 is a schematic structural view of a softswitch equipment as a call control device according to an embodiment of the present invention.

Or, as shown in FIG. 12, the second information exchange module 21 includes a query sub-module 214, a number receiving sub-module 215, a call establishment sub-module 216, and a second transfer sub-module 217.

The query sub-module 214 is adapted to send a terminal number query request to the application server. The terminal number query request carries the client number serving as the called party.

The number receiving sub-module 215 is adapted to receive terminal numbers bound to the client serving as the called party that are returned by the application server.

The call establishment sub-module 216 is adapted to establish a call from a calling party to the client and to the terminals bound to the client.

The second transfer sub-module 217 is adapted to send a call identification and call state information of the call to the application server, so that the application server sends the call identification and the call state information of the call to the client.

The call identification, call state information, and control request involved as well as the specific working process involved in this embodiment can be seen in the relevant contents disclosed in the embodiments involved in FIGS. 1 and 2, and will not be described herein again.

Figure 13:
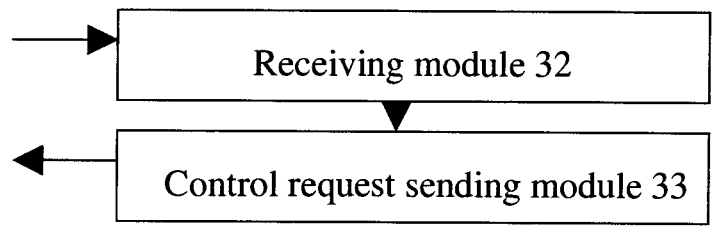
FIG. 13 is a schematic structural view of a client as a call control device according to an embodiment of the present invention.

A client as a call control device according to an embodiment of the present invention is shown in FIG. 13, which includes a receiving module 32 and a control request sending module 33.

The receiving module 32 is adapted to receive a call identification and call state information sent by an application server. The call identification is a call identification corresponding to a call that the number-binding client participates in.

The control request sending module 33 is adapted to send a control request including the call identification and a control instruction to the application server when the call state information indicates that the call is being made, so that the application server notifies a softswitch equipment of controlling the call corresponding to the call identification.

The call identification, call state information, and control request involved as well as the specific working process involved in this embodiment can be seen in the relevant contents disclosed in the embodiments involved in FIGS. 1 and 2, and will not be described herein again.

Figure 14:
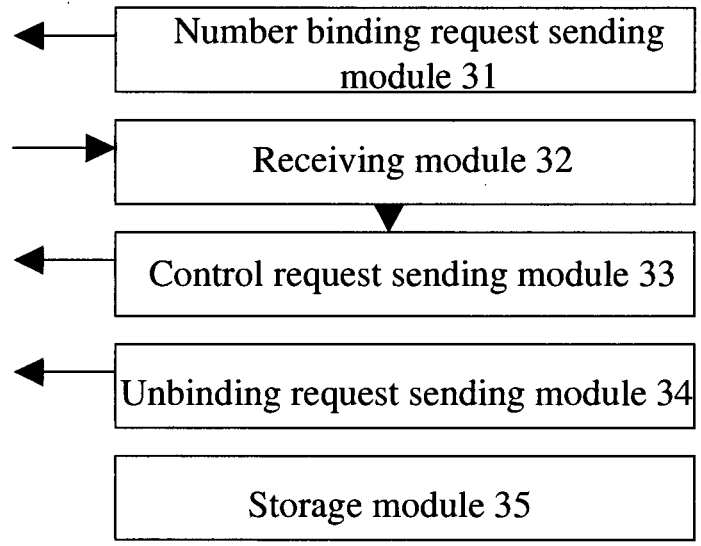
FIG. 14 is a schematic structural view of a client as a call control device according to an embodiment of the present invention.

A client as a call control device according to an embodiment of the present invention is shown in FIG. 14, which includes a number binding request sending module 31, a receiving module 32, a control request sending module 33, an unbinding request sending module 34, and a storage module 35.

The number binding request sending module 31 is adapted to send a number binding request to an application server. The number binding request carries the client number and at least one terminal number to be bound.

The receiving module 32 is adapted to receive a call identification and call state information sent by the application server. The call identification is a call identification corresponding to a call that the number-binding client participates in.

The control request sending module 33 is adapted to send a control request including the call identification and a control instruction to the application server when the call state information indicates that the call is being made, so that the application server notifies a softswitch equipment of controlling the call corresponding to the call identification.

The unbinding request sending module 34 is adapted to send an unbinding request to the application server to unbind the client from terminals with numbers bound.

The storage module 35 is adapted to store a conversation record by the client.

The call identification, call state information, and control request involved as well as the specific working process involved in this embodiment can be seen in the relevant contents disclosed in the embodiments involved in FIGS. 1 and 2, and will not be described herein again.

In the above embodiments of device, the client is bound to terminals, and when the client participates in a call, the network side sends a call identification corresponding to the current call to the client according to binding relations between the client and the terminals. In this way, corresponding relations between calls and call identifications are established, and when the client needs to control a call, the client may send a control request including a call identification to the network side, and the network side identifies the call that the control request of the client is directed to according to the call identification and controls the call.

Figure 15:
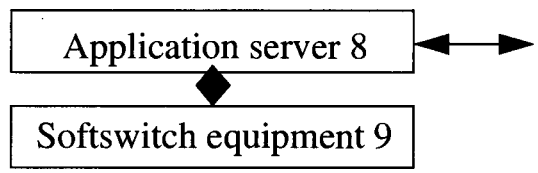
FIG. 15 is a schematic structural view of a call control system according to an embodiment of the present invention.

A call control system according to an embodiment of the present invention is shown in FIG. 15, which includes an application server 8 and a softswitch equipment 9.

The application server 8 is adapted to send to the client a call identification and call state information of a call that a number-binding client participates in, wherein the call identification and the call state information of the call is received from the softswitch equipment; and send to the softswitch equipment a control request including the call identification and a control instruction according to the call identification and the call state information, wherein the control request received from the client.

The softswitch equipment 9 is adapted to establish the call, send the call identification and the call state information, and control the call according to the control request from the client.

The call identification, call state information, and control request involved as well as the specific working process involved in this embodiment can be seen in the relevant contents disclosed in the embodiments involved in FIGS. 1 and 2, and will not be described herein again.

In the above embodiment, a call identification and call state information are sent to the client, the client may send a control request including the call identification to the network side, and the network side identifies a call that the control request of the client is directed to according to the call identification and controls the call, which avoids the problem in the prior art that a call cannot be interrupted once initiated, simplifies the entire system process, and saves system and network resources as well as users' time.

Figure 16:
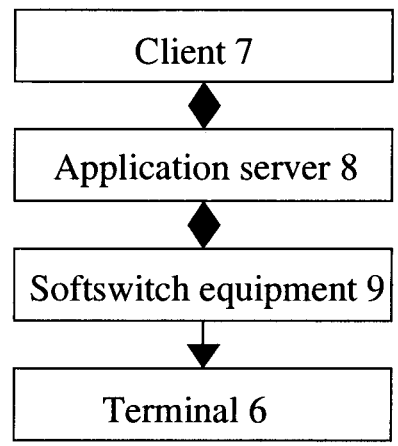
FIG. 16 is a schematic structural view of a call control system according to an embodiment of the present invention.

A call control system according to an embodiment of the present invention is shown in FIG. 16, which includes a client 7, an application server 8, a softswitch equipment 9, and a terminal 6.

The client 7 is adapted to send a number binding request, receive a call identification corresponding to a call that the number-binding client participates in and sent by the application server, and send a control request for the call according to the call identification.

The application server 8 is adapted to perform number binding on the client and terminals in the number binding request, and send the call identification and call state information to the client wherein the call identification and the call state information are received from the softswitch equipment.

The softswitch equipment 9 is adapted to establish the call, send the call identification and the call state information, and control the call according to the control request of the client.

The terminal 6 is adapted to initiate or receive the call under the control of the softswitch equipment.

The terminal includes an analog phone, a digital phone, a soft phone, a fax machine, or a mobile phone.

The call identification, call state information, and control request involved as well as the specific working process involved in this embodiment can refer to the relevant contents disclosed in the embodiments involved in FIGS. 1 and 2, and will not be described herein again.

In the above embodiments of system, the client is bound to terminals, and when the client participates in a call, the network side sends a call identification corresponding to the current call to the client, the client may send a control request including the call identification to the network side, and the network side identifies the call that the control request of the client is directed to according to the call identification and controls the call.

Persons of ordinary skill in the art should understand that that all of or a part of processes in the method according to the embodiments may be implemented by a computer program instructing relevant hardware. The program may be stored in a computer readable storage medium. When the program is executed, the processes of the method according to the embodiments of the present invention are performed. The storage medium may be a magnetic disk, an optical disk, a read-only memory (ROM) or a random access memory (RAM).

The above descriptions are merely specific implementations of the present invention, but not intended to limit the protection scope of the present invention. Variations or replacements that can be easily thought of by persons skilled in the art within the technical scope disclosed in the present invention shall fall within the protection scope of the present invention. Therefore, the protection scope of the present invention shall be defined by the claims.

What is claimed is:

1. A call control method, comprising:
   receiving a number binding request from a client, wherein the number binding request carries a client number and at least one terminal number to be bound;
   binding the at least one terminal number to the client number;
   sending, to the client, a call identification and call state information of a call that a number-binding client participates in;
   receiving a control request comprising: the call identification, and a control instruction sent by the client according to the call identification and the call state information; and
   sending the control request comprising the call identification and the control instruction to a softswitch equipment, wherein the softswitch equipment controls the call corresponding to the call identification according to the control instruction.

2. The method according to claim 1, wherein sending, to the client, a call identification and call state information of a call that a number-binding client participates in further comprises:
   receiving a call request of the client, wherein the call request carries the client number, a calling number comprising the at least one terminal number bound to the client number, and a called terminal number;
   sending the call request to the softswitch equipment, wherein the softswitch equipment connects the call according to the call request;
   receiving the call identification and the call state information of the call sent by the softswitch equipment; and
   sending the call identification and the call state information of the call to the client.

3. The method according to claim 1, wherein sending, to the client, a call identification and call state information of a call that a number-binding client participates in comprises:
   receiving a terminal number query request sent by the softswitch equipment, wherein the terminal number query request carries the client number serving as a called party;
   returning, to the softswitch equipment, the terminal number(s) bound to the client number serving as the called party, wherein the softswitch equipment connects the call according to the client number serving as the called party and the terminal number(s) bound to the client serving as the called party;
   receiving the call identification and the call state information of the call sent by the softswitch equipment; and
   sending the call identification and the call state information of the call to the client.

4. The method according to claim 1, further comprising:
   receiving an unbinding request sent by the client; and
   unbinding the client number from the at least one terminal number.

5. A call control method, comprising:
   receiving a number binding request from a client, wherein the number binding request carries a client number and at least one terminal number to be bound;
   binding the at least one terminal number to the client number;
   sending, to an application server, a call identification and call state information of a call that a number-binding client participates in, wherein the application server sends the call identification and the call state information of the call to the client;
   receiving a control request comprising the call identification and a control instruction sent by the application server; and
   controlling the call corresponding to the call identification according to the control instruction.

6. The method according to claim 5, wherein the sending, to an application server, the call identification and the call state information of the call that the number-binding client participates in comprises:
   receiving a call request sent by the application server, wherein the call request carries a client number, a calling number comprising the at least one terminal number bound to the client number, and a called terminal number;
   establishing a call from a calling terminal to a called terminal according to the call request; and
   sending the call identification and the call state information of the call to the application server, wherein the application server sends the call identification and the call state information of the call to the client.

7. The method according to claim 5, wherein the sending, to an application server, the call identification and the call state information of the call that the number-binding client participates in comprises:
   sending a terminal number query request to the application server, wherein the terminal number query request carries a client number serving as a called party;
   receiving the terminal number(s) bound to the client number serving as the called party, wherein the terminal number(s) is returned by the application server;
   establishing the call from a calling party to the client and to the terminal(s) bound to the client number; and
   sending the call identification and the call state information of the call to the application server, wherein the application server sends the call identification and the call state information of the call to the client.

8. A call control system, comprising an application server and a softswitch equipment, wherein
   the application server is adapted to:
   send to a client a call identification and call state information of a call that a number-binding client participates in, wherein the call identification and the call state information of the call is received from the softswitch equipment; and send to the softswitch equipment a control request comprising the call identification and a control instruction according to the call identification and the call state information, wherein the control request is received from the client; and the softswitch equipment is adapted to establish the call, send the call identification and the call state information, and control the call according to the control request from the client.

\* \* \* \* \*